US008981766B2

(12) United States Patent
Burkhardt

(10) Patent No.: US 8,981,766 B2
(45) Date of Patent: Mar. 17, 2015

(54) POSITION/DISPLACEMENT MEASURING SYSTEM

(75) Inventor: Thomas Burkhardt, Zell (DE)

(73) Assignee: BALLUFF GmbH, Neuhausen (DE)

( * ) Notice: Subject to any disclaimer, the term of this patent is extended or adjusted under 35 U.S.C. 154(b) by 216 days.

(21) Appl. No.: 13/590,296

(22) Filed: Aug. 21, 2012

(65) Prior Publication Data
US 2013/0057259 A1  Mar. 7, 2013

(30) Foreign Application Priority Data

Sep. 6, 2011 (DE) .......................... 10 2011 053 309

(51) Int. Cl.
G01B 7/14 (2006.01)
G01D 5/244 (2006.01)
G01D 5/245 (2006.01)

(52) U.S. Cl.
CPC .......... G01D 5/24438 (2013.01); G01D 5/2457 (2013.01)
USPC .................................................... 324/207.11

(58) Field of Classification Search
USPC .................................................... 324/207.11
See application file for complete search history.

(56) References Cited

U.S. PATENT DOCUMENTS

| 5,279,044 | A  | 1/1994  | Bremer |
| 6,545,262 | B1 | 4/2003  | Burgschat |
| 6,813,844 | B1 | 11/2004 | Steinich |
| 7,503,231 | B2 | 3/2009  | Shoji |
| 8,179,129 | B2 | 5/2012  | Burkhardt et al. |
| 8,274,274 | B2 | 9/2012  | Burkhardt et al. |
| 8,698,488 | B2 * | 4/2014 | Lohberg et al. ............... 324/174 |
| 2002/0021450 | A1 | 2/2002 | Aoki |
| 2004/0174161 | A1 | 9/2004 | Tausch et al. |
| 2005/0060905 | A1 | 3/2005 | Novak et al. |
| 2007/0074416 | A1 | 4/2007 | Reusing |
| 2008/0061771 | A1 | 3/2008 | Sugiyama et al. |
| 2009/0271998 | A1 | 11/2009 | Carlen et al. |
| 2010/0102804 | A1 | 4/2010 | Burkhardt et al. |
| 2010/0207617 | A1 * | 8/2010 | Novak et al. ............. 324/207.25 |
| 2010/0219811 | A1 | 9/2010 | Bauch et al. |
| 2010/0244815 | A1 | 9/2010 | Burkhardt et al. |
| 2011/0101964 | A1 | 5/2011 | Ausserlechner et al. |

(Continued)

FOREIGN PATENT DOCUMENTS

| DE | 1 930 976    | 12/1970 |
| DE | 692 22 072   | 3/1998  |
| DE | 100 28 136   | 12/2000 |

(Continued)

OTHER PUBLICATIONS

"Lineare Weg-und Abstandssensoren" (Linear Displacement and Distance Sensors), Thomas Burkhardt, Albert Feinäugle, Sorin Fericean, Alexander Forkl, Verlag moderne Industrie, Die Bibliothek der Technik, vol. 271, Munich 2004, chapter "Wegsensoren mit magnetisch kodiertem Maßkörper", pp. 67-76.

Primary Examiner — Bot Ledynh
(74) Attorney, Agent, or Firm — Lipsitz & McAllister, LLC

(57) ABSTRACT

The invention relates to a position/displacement measuring system comprising at least one encoded scale body having at least one encoding track extending in a measuring direction and a sensor device having at least one sensor head sensitive to the encoding, wherein the at least one sensor head comprises at least a first sensor unit and a second sensor unit which provide respective sensor signals and are spaced apart from one another in the measuring direction.

21 Claims, 4 Drawing Sheets

(56) References Cited

U.S. PATENT DOCUMENTS

2011/0193552 A1    8/2011    Fulkerson et al.
2012/0007589 A1*    1/2012    Okada ........................ 324/207.2

FOREIGN PATENT DOCUMENTS

| | | |
|---|---|---|
| DE | 100 52 086 | 1/2002 |
| DE | 102 10 326 | 9/2003 |
| DE | 10 2005 039 280 | 2/2007 |
| DE | 10 2005 055 905 | 5/2007 |
| DE | 10 2006 010 161 | 8/2007 |
| DE | 10 2007 008 870 | 9/2008 |
| DE | 10 2008 055 680 | 4/2010 |
| DE | 20 2009 003 253 | 8/2010 |
| DE | 10 2009 016 663 | 10/2010 |
| EP | 2 236 990 | 10/2010 |
| GB | 1 319 531 | 6/1973 |

* cited by examiner

POSITION/DISPLACEMENT MEASURING SYSTEM

This application claims the benefit of German application number 10 2011 053 309.5 filed on Sep. 6, 2011, which is incorporated herein by reference in its entirety and for all purposes.

BACKGROUND OF THE INVENTION

The invention relates to a position/displacement measuring system comprising at least one encoded scale body having at least one encoding track extending in a measuring direction and a sensor device having at least one sensor head sensitive to the encoding.

Displacement sensors with magnetically encoded scale body are described in the book "Lineare Weg-und Abstandssensoren" (Linear Displacement and Distance Sensors) by T. Burkhardt, A. Feinäugle, S. Fericean and A. Forkl, Verlag Moderne Industrie, Bibliothek der Technik, Volume 271, Munich 2004.

DE 10 2009 016 663 A1 discloses a position/displacement measuring system, comprising at least one encoded scale body having at least one encoding track, and a sensor device having at least one sensor sensitive to the encoding, wherein the at least one encoding track comprises main fields of at least a first type and a second type which are arranged in a periodically alternating manner in at least a first direction. The main fields of the first type and the main fields of the second type are each subdivided into subfields of at least two different types.

DE 10 2008 055 680 A1 discloses a position/displacement measuring system comprising a sensor head and an encoded scale body, wherein the scale body has an absolute position determination region and an incremental position determination region.

DE 20 2009 003 253 U1 discloses an encoded scale body for a position/displacement measuring system comprising a support band, at least one encoding layer made of encoding material which is arranged on the support band, and a cover band which covers the encoding material towards the outside space, wherein the cover band is formed by the support band.

SUMMARY OF THE INVENTION

In accordance with an embodiment of the present invention, a position/displacement measuring system is provided which operates in a fail-safe or disturbance-safe manner.

In accordance with an embodiment of the invention, the at least one sensor head comprises a first sensor unit and a second sensor unit which provide respective sensor signals and are spaced apart from one another in the measuring direction.

By providing for the sensor head to comprise (at least) a first sensor unit and a second sensor unit, simultaneous measurements at different locations of the encoding track are possible. This allows disturbances in the at least one encoding track to be detected and, where required, measurement irregularities caused by disturbances in the scale body to be accounted for or compensated. It is in principle possible for both "random" disturbances and systematic disturbances to be detected.

It is for example possible for a plausibility check to be carried out by comparing measurement signals of the first sensor unit and the second sensor unit. In the absence of disturbances, the difference between the measurement signals of the first sensor unit and the second sensor unit should in principle be below a certain threshold. When a threshold value is exceeded, it indicates a disturbance in the scale body. By providing the at least first sensor unit and second sensor unit, an increased redundancy is achieved in order, for example, to satisfy increased safety requirements.

It is thus for example also possible to compensate for phase jumps and/or gaps occurring at ends of a scale body. When a scale body is arranged for example around a curved object, such as a cylindrical object, ends can meet in abutting relationship with one another or a gap can exist between opposing ends. With the first sensor unit and the second sensor unit being spaced apart from one another, a gap can be passed over and a relevant measurement signal can always be generated provided that the distance between the first sensor unit and the second sensor unit is larger than the gap. A phase jump at a gap can then be compensated.

It is advantageous for the first sensor unit and the second sensor unit to be of identical configuration. In particular, these then deliver the same signal levels in comparable situations. The existence of a disturbance or gap etc. can then be inferred from the presence of signal level differences.

In an advantageous embodiment, the at least one encoding track is periodically encoded with periodically arranged fields of a width B in the measuring direction. By moving the sensor body relative to the at least one encoding track, the position or displacement of the sensor head relative to the at least one encoding track can be easily determined.

In an embodiment, the at least one encoding track is magnetically encoded and the sensor head is magnetic field sensitive. The magnetic encoding is achieved by arranging magnetic north pole fields and south pole fields in an alternating manner.

In an embodiment, the first sensor unit and the second sensor unit each comprise a first sensor and a second sensor which are arranged in an offset relationship relative to one another in the measuring direction. When moved relative to the at least one encoding track, the first sensor and the second sensor output offset signals. This allows periods (for example magnetic periods) to be counted in a direction-dependent manner in order to enable position determination or displacement determination. By way of example, the first sensor is a sine sensor and the second sensor is a cosine sensor. Thus, the first sensor and the second sensor provide signals that are offset in phase, from which it is then possible to determine in particular an angle within one period, this in turn enabling the position or displacement to be determined. For example, the first sensor and the second sensor are integrated in a common sensor chip which forms the corresponding sensor unit.

In an embodiment, the at least one sensor head comprises a housing and the first sensor unit is arranged at or in the proximity of a front end of the housing and/or the second sensor unit is arranged at or in the proximity of a rear end of the housing, wherein, in particular, the distance between the first sensor unit and the second sensor unit is greater than a distance of the first sensor unit to the front end and/or a distance of the second sensor unit to the rear end. This allows a large distance between the first sensor unit and the second sensor unit to be achieved. This in turn makes it possible to measure simultaneously in regions of the encoded track that have a correspondingly large distance between them. By way of example, this in turn allows for a relatively large gap in the at least one encoding track to be bridged. It is therefore also possible for locally confined disturbances to be compensated.

It is advantageous for the at least one scale body to comprise at least one reference marker and for the at least one sensor head to comprise at least one reference marker sensor unit via which the at least one reference marker can be detected. Absolute positions can thereby be detected.

It is advantageous for an interpolator device to be provided which follows the first sensor device and the second sensor device. Using an interpolator device, it is possible to determine for the corresponding sensor device an angle within one period from which it is then possible to determine the displacement information or position information.

It is further advantageous for an output driver device to be provided. This then provides for example digital output signals which contain position information or displacement information. The output driver device can be part of an interpolator device.

In an exemplary embodiment, the first sensor unit and the second sensor unit have a common output driver associated with them. This allows the wiring expenditure for the sensor head to be kept low.

In an alternative embodiment, the first sensor unit and the second sensor unit have separate output drivers associated with them. This allows measurement signals of the first sensor unit and of the second sensor unit to be led to the outside. By way of example, a control device that is superimposed on the position/displacement measuring system can then perform a plausibility check or the like.

It is advantageous for an evaluation device to be provided by which a check is made or capable of being made as to whether a difference between a measurement signal of the first sensor unit and a measurement signal of the second sensor unit is smaller than a predetermined nonlinearity of the sensor unit or sensor units. This allows a plausibility check to be performed in order, for example, to detect and, where required, to account for or compensate disturbances.

It is advantageous for the predetermined nonlinearity to be two times a maximum nonlinearity, said nonlinearity being the nonlinearity in the first sensor unit or the nonlinearity in the second sensor unit. It is thereby possible to ensure that a disturbance has to be present if the predetermined nonlinearity is exceeded.

It is further advantageous for an evaluation device to be provided by which a comparison of measurement signals of the first sensor unit and the second sensor unit is carried out or capable of being carried out. From the comparison, it is possible to determine whether a disturbance (in particular of the periodicity of the scale body), for example a gap, exists and if so, where such gap is located. Thus, for example, passing over a gap can in turn be compensated, for example by selecting the measurement signals of a particular sensor unit for further processing.

It is then advantageous for a switch device to be provided by which it is switchable whether measurement signals of the first sensor unit or of the second sensor unit are used for position/displacement determination. For example, gap-free measurement can thereby be achieved even if the sensor head traverses a gap in the at least one encoding track. By way of example, provision may be made for the measurement signals of a particular sensor unit to be used and, when that particular sensor unit is in the region of a gap, for the measurement signals of the other sensor unit to be used and, when the gap has been passed over by all of the sensor units, for the measuring signals of first mentioned sensor unit to be used again.

In particular, the switch device is supplied with measuring signals of the first sensor unit and the second sensor unit and performs a comparison. The switch device (which is in particular part of an evaluation device) can then determine which are the relevant measurement signals. The switch device can be implemented in hardware and/or in software.

In an embodiment, the at least one encoding track has a first end and a second end, said ends abutting one another or being spaced apart from one another leaving a gap therebetween. In particular, provision is then made for the distance between the first sensor unit and the second sensor unit in the sensor head in the measuring direction to be greater than the distance between the first end and the second end of the at least one encoding track. This allows a position signal or a displacement signal to be generated even when the sensor head is passing over the gap.

In particular, the at least one encoding track is configured as an incremental track. By counting periods, starting from a reference position, position determination or displacement determination can be achieved.

In particular, the at least one sensor head is positioned and/or guided in a non-contacting manner over the at least one encoding track. In principle, it is possible for the sensor head to be moved relative to the at least one encoding track and/or for the at least one encoding track to be moved relative to the sensor head.

The following description of preferred embodiments serves in conjunction with the drawings to explain the invention in greater detail.

DETAILED DESCRIPTION OF THE INVENTION

Figure 1:
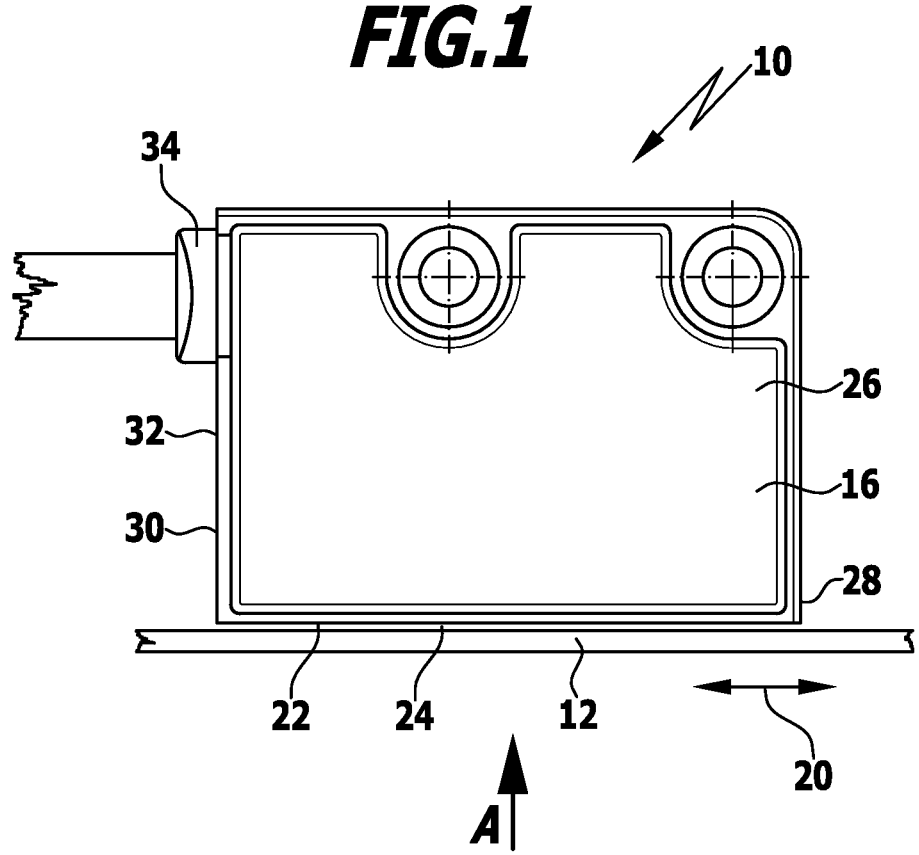
FIG. 1 is a schematic illustration showing a partial side view of an exemplary embodiment of a position/displacement measuring system in accordance with the invention.
Figure 2:
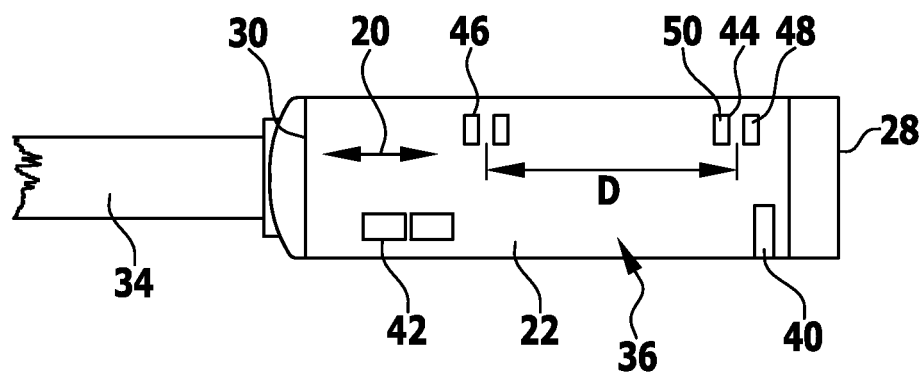
FIG. 2 is a view of a sensor head of the position/displacement measuring system in accordance with FIG. 1, shown in the direction A.

An exemplary embodiment of a position/displacement measuring system in accordance with the invention, which is shown schematically in FIG. 1 and indicated therein by 10, comprises an encoded scale body 12. The scale body 12 is for example magnetically encoded. To this end, the scale body 12 comprises for example a support on which the magnetic encoding is arranged. The magnetic encoding is formed for example by a plastic band (tape) which is flexible and magnetizable. The scale body 12 is encoded by a corresponding alternating periodic arrangement of encoding fields 14 (refer to FIG. 3, for example).

In the exemplary case of a magnetically encoded scale body 12, the encoding is made by a corresponding alternating periodic arrangement of pole fields of the north pole type and pole fields of the south pole type.

The magnetic field lines of these pole fields form a three-dimensional vector field. A sensor head 16 is arranged, in particular movably, in this field.

The scale body 12 has (at least) one encoding track 18 (refer to FIG. 3, for example) which contains the encoding. The encoding track 18 extends in a measuring direction 20. The corresponding encoding fields 14 have a width B in the measuring direction. In particular, the width B in the measuring direction 20 is the same for all of the encoding fields 14.

The encoding track 18 also has an extension in a direction transverse to the measuring direction 20 so that the corresponding encoding fields 14 have a two-dimensional extension.

The position or the displacement (the movement) of the sensor head 16 relative to the scale body 12 can be determined in the measuring direction 20.

The sensor head 16 is positioned or guided in a non-contacting manner over the scale body 12. With an underside 22 thereof, the sensor head 16 is spaced from the scale body 12 in a third direction, said third direction being oriented in a direction transverse to the direction of two-dimensional extension of the encoding fields 14. An air gap 24 is located between the underside 22 of the sensor head 16 and the scale body 12.

A normal direction of the encoding fields 14 is parallel to a direction in which the sensor head 16 and the scale body 12 are spaced apart.

The sensor head 16 has a housing 26 having a front end 28 and a rear end 30 opposite the front end 28. By way of example, an outgoing cable device 34 is arranged on a side 32 of the housing 26 at which the rear end 30 is located. Via one or more corresponding cables, the sensor head 16 can be supplied with electrical power and sensor signals (which are in particular already processed) can be led away.

The underside 22, which extends between the front end 28 and the rear end 30, is for example formed as a flat side. However, it is in principle also possible for said underside 22 to be curved.

The scale body 12 can, for example, be adapted to a flat surface, or it can also be curved. By way of example, the scale body 12 including the encoding track 18 is affixed to a cylindrical object in order to enable rotary positions or rotary displacements to be detected.

The sensor head 16 is part of a sensor device 36 which comprises sensors sensitive to the encoding of the scale body 12. The scale body 12 is a passive part within the position/displacement measuring system. The sensor device 36 including the sensor head 16 is active in the sense that it provides the corresponding measurement signals.

The sensor head 16 has a viewing direction which is directed from the underside 22 to the scale body 12.

The encoding track 18 is an incremental track for incremental position determination.

Provision may be made for the scale body 12 to have, in addition to the (at least one) encoding track 18, one or more reference markers 38 which are arranged in particular beside the encoding track 18.

The sensor head 16 then comprises a reference marker sensor unit 40 via which the presence of a reference marker 38 can be detected. A reference position as a starting point of an incremental measurement can thereby be detected by the sensor head 16 (when the sensor head 16 is correspondingly positioned).

By way of example, provision may also be made for the sensor head 16 to comprise an endpoint sensor unit 42 in order to detect endpoints of an encoding track 18.

The sensor head 16, which comprises a plurality of sensor units, is then preferably configured such that a reference marker sensor unit 40 or an endpoint sensor unit 42 is offset, in a transverse direction relative to the measuring direction 20, with respect to sensor units for the actual position/displacement determination on the encoding track 18.

For the purpose of actual position/displacement determination, the sensor head 16 comprises a first sensor unit 44 and a second sensor unit 46. The first sensor unit 44 and the second sensor unit 46 are spaced apart from one another at a distance D in the measuring direction 20. The sensor head 16 is positioned with respect to the encoding track 18 such that "in the normal case" (see below) both the first sensor unit 44 and the second sensor unit 46 are located above the encoding track 18, wherein, however, corresponding spaced-apart regions of the encoding track 18 are coupled to the first sensor unit 44 and the second sensor unit 46. These corresponding regions are in turn spaced apart from one another in the measuring direction 20.

The first sensor unit 44 and the second sensor unit 46 can simultaneously provide measurement signals which are determined by the position with respect to the encoding track 18, that is, simultaneous measurements are taken at different locations of the scale body 12.

In an embodiment, the first sensor unit 44 and the second sensor unit 46 are of identical configuration.

Furthermore, in a preferred embodiment, the first sensor unit 44 is located at or in the proximity of the front end 28. The second sensor unit 46 is preferably located at or in the proximity of the rear end 30.

In principle, it is also possible to provide an absolute determination track in addition to the incremental encoding track 18. In this connection, reference is made to DE 2008 055 680 A1 or U.S. Pat. No. 8,179,129. These documents are incorporated herein and made a part hereof by reference.

In an embodiment, the first sensor unit 44 and the second sensor unit 46 each comprise a first sensor 48 and a second sensor 50. The first sensor 48 and the second sensor 50 are offset from one another in the measuring direction 20. The distance by which the first sensor 48 is offset from the second sensor 50 within the sensor unit 44 or 46 is in particular smaller than the distance D.

The distance between the first sensor 48 and the second sensor 50 is selected such that the phase difference between signals of the first sensor 48 and the second sensor 50 is an odd integer multiple of 90°. For sinusoidal signals, when for example the first sensor 48 delivers a sine signal, the second sensor 50 delivers a cosine signal. The first sensor 48 and the second sensor 50 are therefore also called sine sensor and cosine sensor.

Figure 3:
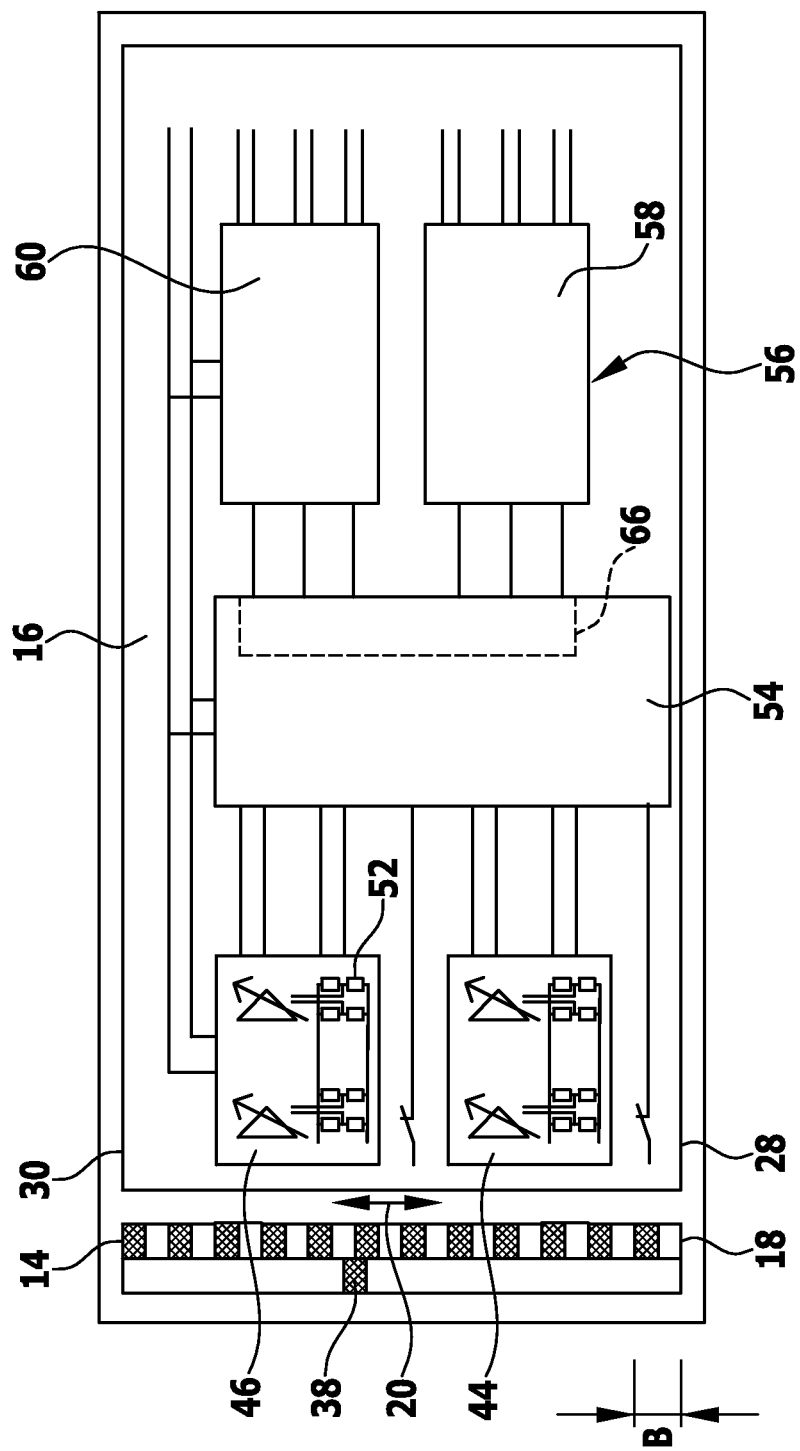
FIG. 3 is a schematic partial representation of an exemplary embodiment of a displacement measuring system in accordance with the invention.

The first sensor 48 and the second sensor 50 are implemented for example via magnetic field sensitive bridges 52 (compare FIG. 3).

The sensor head 16 contains signal processing electronics and evaluation electronics in the housing 26.

In particular, an interpolator device 54 is provided which follows the first sensor unit 44 and the second sensor unit 46. The latter provide their measurement signals to the interpolator device 54. In the interpolator device 54, the measurement signals of the first sensor 48 and the second sensor 50 of the respective first sensor unit 44 and second sensor unit 46 are converted to an angle within one period of the encoding track 18. Depending on the configuration of the sensor system, the period is formed by the pole width B or the width of a pole pair. Using the angle of the two sensors 48 and 50 and the period, it is then possible to determine the position of the corresponding sensor unit 44 or 46 and thus the relative position of the sensor head 16 on the encoding track 18.

In principle, it is possible to provide for one interpolator device 54 to be common to the first sensor unit 44 and the second sensor unit 46. It is also possible for every sensor unit to have an interpolator device of its own.

The sensor head 16 can then provide corresponding position signals via an output driver device 56. By way of example, digital A/B pulses are output which characterize the position.

In principle, it is possible for the output driver device 56 to comprise a first output driver 58, which is associated with the first sensor unit 44. Said first output driver 58 provides the corresponding position signals that are determined by using measurement signals of the first sensor unit 44. Furthermore, a second output driver 60 is provided, which is associated with the second sensor unit 46 and provides corresponding position signals that are determined via the second sensor unit 46.

Figure 5:
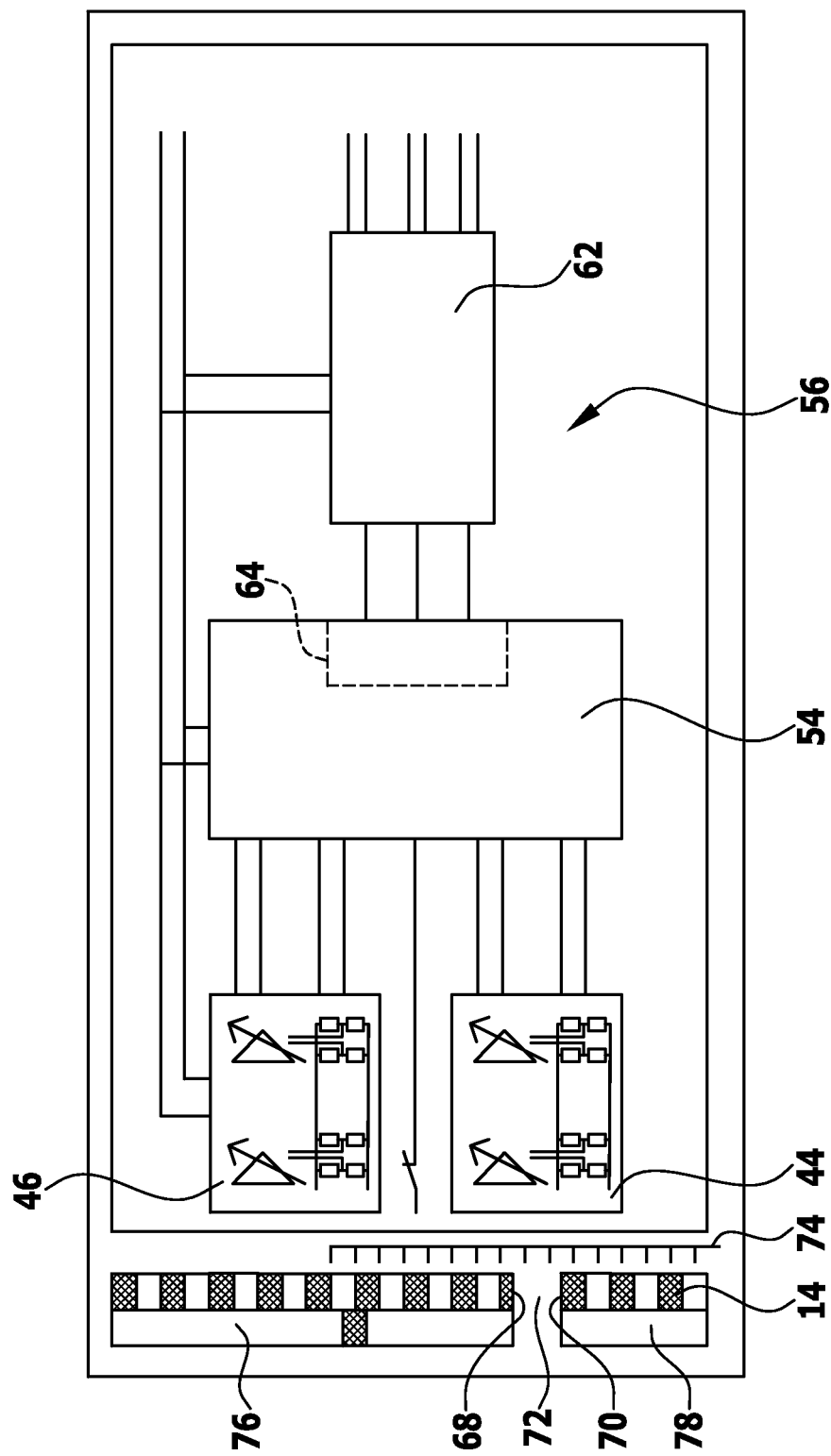
FIG. 5 is a representation of the displacement measuring system in accordance with FIG. 4, showing a modified scale body.

In an alternative embodiment, which is shown schematically in FIG. 5, the output driver device 56 comprises a common output driver 62 for the first sensor unit 44 and the second sensor unit 46, thus minimizing the wiring expenditure, for example. In this case, the sensor head 16 comprises in particular an evaluation device 64 which makes a decision as to which measurement signal is output to the outside via the output driver 62.

By providing the first sensor unit 44 and the second sensor unit 46, which are spaced apart in the measuring direction 20, it being in principle possible to provide further sensor units, such as a third sensor unit etc., redundant position/displacement determination can be implemented.

In an exemplary embodiment, an evaluation device 66 is provided which can have the evaluation device 64 integrated therein and which compares the measurement signals of the first sensor unit 44 and second sensor unit 46 and checks them for plausibility.

In principle, each of the sensor units 44 and 46 has a nonlinearity. In the absence of a disturbance (in particular of the periodicity) in the scale body 12, the difference between the measurement signals of the first sensor unit 44 and the second sensor unit 46 should be smaller than a maximum nonlinearity. The maximum nonlinearity is at least approximately twice the nonlinearity of the first sensor unit 44 or the nonlinearity of the second sensor unit 46, whichever is larger.

Figure 4:
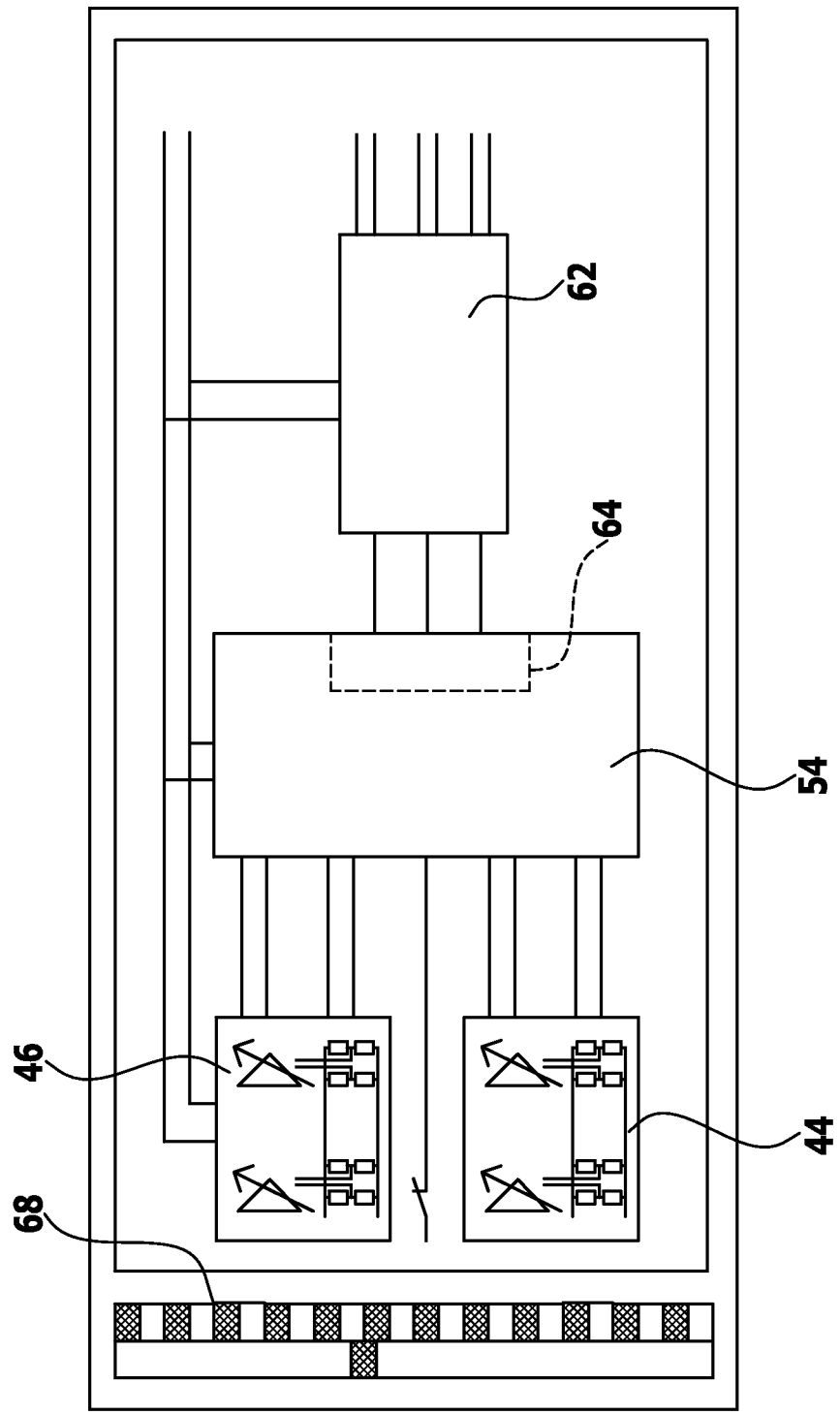
FIG. 4 is a schematic partial representation of a further exemplary embodiment of a displacement measuring system in accordance with the invention.

For example, if the encoding track 18 has a point of disturbance (such a point of disturbance is indicated in FIG. 4 by the reference numeral 68), then this may result in a difference between measurement signals of the first sensor unit 44 and the second sensor unit 46 that is above the maximum nonlinearity. In principle, this results in a position difference in the evaluation when the position is determined on the basis of the measurement signals of the first sensor unit 44 and on the basis of the measurement signals of the second sensor unit 46. Such a "measured" position difference between the path of the first sensor unit 44 and the path of the second sensor unit 46 can be recognized by the evaluation device 66 and corresponding action can be taken.

It is possible for the evaluation device 66 to be integrated internal to the sensor head 16 or to be integrated external to the sensor head 16 in a subsequent control device.

When the evaluation device 66 is integrated in the sensor head 16, then in a sense, the sensor head 16 itself has to perform the plausibility check.

As a rule, the encoding track 18 has a first end 68 and a second end 70 (compare FIG. 5). For example, when the scale body 12 including the encoding track 18 is placed around a curved object, then an abutting relationship exists if the first end 68 is in contact with the second end 70, or, as illustrated in FIG. 5, a gap 72 exists between the first end 68 and the second end 70. This gap 72 can disturb the position/displacement determination process. Using the solution in accordance with the invention, gaps 72 in the scale body 12 can be recognized and a compensation process can be performed in order to achieve gap-free position/displacement determination.

This is explained by way of example with the help of FIG. 5.

A phase jump occurs in the region of the gap 72. The explanation is shown on scale 74. The lines on the scale 74, in the upper region thereof, indicate the pole pitch. In the lower region, the lines are no longer located at edges of corresponding encoding fields 14 but at the centre thereof. Therefore, the period has a phase jump at the point of abutment (in the region of the gap 72); the region that follows the second end 70 is shifted by half the width B. In principle, this can lead to nonlinearities. As a result, it is also possible for a strong speed dependency to exist: owing to the gap 72 (the point of abutment), when the corresponding region at the gap 72 is slowly traversed by the sensor head 16, a high speed can be recognized because of the corresponding jump. Depending on a minimum edge separation and a mechanical resolution, such a pronounced change in speed can lead to an incorrect indication of position/displacement, in particular when a new position cannot be output fast enough because otherwise the minimum edge separation would fall below the minimum value thereof or a period would be missed.

With the solution in accordance with the invention, such disturbances in position/displacement determination can be avoided. In principle, no phase constancy need be present at the ends 68 and 70 and, furthermore, a gap 72 is allowed to be present. In particular, the width of the gap 72 in the measuring direction 20 should be smaller than the distance D between the first sensor unit 44 and the second sensor unit 46.

When the sensor head 16 travels over a region 76 of the encoding track 18 which has the first end 68 formed therein, then the measurement signals of the first sensor unit 44 and the second sensor unit 46 are in principle identical. If the signal level is high enough, corresponding output signals can be provided (taking the reference marker sensor unit 40 into account). The signals of the first sensor 48 and the second sensor 50 of each sensor unit 44 and 46 are unique within one period. The interpolator device 54 can determine the angle within one period and the corresponding, in particular digital, pulses can then be provided to an output. Provision can be made for only one measurement signal of either the first sensor unit 44 or the second sensor unit 46 to be output, and/or a comparison between the measurement signals can be made for a plausibility check to thereby allow for disturbances and in particular damage to the encoding track 18 to be taken into account.

When the sensor head 16 is moved from the region 76 to a region 78 in which the second end 70 is formed, then the signal level of measurement signals of the first sensor unit 44 is reduced in the area of the gap 72. The measurement signal of the first sensor unit 44 is reduced to zero when the gap 72 is accordingly large in size. When the second sensor unit 46 is located in the upper region 76, it still delivers a measurement signal having a corresponding signal level. This allows for position/displacement determination to be performed via the second sensor unit 46 and no longer via the first sensor unit 44. The interpolator device 54 can still work, using measurement signals of the second sensor unit 46, thereby generating digital output pulses.

As the first sensor unit 44 is moved further, it reaches the region 78 and thus again provides measurement signals that have an appropriate signal level. By use of the evaluation device 64 or 66, a comparison can be performed, and if it is recognized for example that the signal level of signals of the second sensor unit 46 is being reduced, a switch device can be used to perform a switching action which causes the interpolator device to then use measurement signals of the first sensor unit 44 in order to provide digital output signals.

With further movement, the first sensor unit 44 and the second sensor unit 46 deliver the measurement signal of an appropriate signal level, and it is then again possible to perform for example a switching action which causes the corresponding output signals now to be delivered by the second sensor unit 46.

This method is independent of the direction of movement of the sensor head 16 relative to the scale body 12. By way of example, it is also possible to reverse the direction of rotation in the case of the scale body 12 rotating relative to the sensor head 16 or to reverse the orbital path in the case of the sensor head 16 moving in an orbital movement relative to the scale body 12.

By way of example, the solution in accordance with the invention further allows gap-free determination of the position of the sensor head 16 on a scale body 12 which has a plurality of encoding tracks 18 placed one behind the other, with the encoding tracks that follow directly one after the other laid in abutting relationship or with a gap therebetween.

The solution in accordance with the invention allows irregularities in the scale body 12 to be detected by comparing measurement signals of the first sensor unit 44 and the second sensor unit 46. Abutments or gaps 72, in particular gaps with widths smaller than the distance D between the first sensor unit 44 and the second sensor unit 46, can be compensated with respect to the position/displacement determination, that is they do not have a disturbing effect on the position/displacement determination process.

LIST OF REFERENCE NUMBERS

10 Position/displacement measuring system
12 Scale body
14 Encoding field
16 Sensor head
18 Encoding track
20 Measuring direction
22 Underside
24 Air gap
26 Housing
28 Front end
30 Rear end
32 Side
34 Outgoing cable device
36 Sensor device
38 Reference marker
40 Reference marker sensor unit
42 Endpoint sensor unit
44 First sensor unit
46 Second sensor unit
48 First sensor
50 Second sensor
52 Magnetic field sensitive region
54 Interpolator device
56 Output driver device
58 First output driver
60 Second output driver
62 Output driver
64 Evaluation device
66 Evaluation device
68 First end
70 Second end
72 Gap
74 Scale
76 Region
78 Region

The invention claimed is:

1. Position/displacement measuring system, comprising:
   at least one encoded scale body having at least one encoding track extending in a measuring direction;
   a sensor device having at least one sensor head sensitive to the encoding;
   the at least one sensor head comprising at least a first sensor unit and a second sensor unit which provide respective measurement signals and are spaced apart from one another in the measuring direction; and
   an evaluation device by which a check is made or capable of being made as to whether a difference between the measurement signal of the first sensor unit and the measurement signal of the second sensor unit is smaller than a predetermined nonlinearity of the sensor unit or sensor units.

2. Position/displacement measuring system in accordance with claim 1, wherein the first sensor unit and the second sensor unit are of identical configuration.

3. Position/displacement measuring system in accordance with claim 1, wherein the at least one encoding track is periodically encoded with periodically arranged fields of a width B in the measuring direction.

4. Position/displacement measuring system in accordance with claim 1, wherein the at least one encoding track is magnetically encoded and the at least one sensor head is magnetic field sensitive.

5. Position/displacement measuring system in accordance with claim 1, wherein the first sensor unit and the second sensor unit each comprise a first sensor and a second sensor which are arranged in an offset relationship with respect to one another in the measuring direction.

6. Position/displacement measuring system in accordance with claim 5, wherein a phase difference between signals of the first sensor and the second sensor is n×90°, where n is an odd natural number.

7. Position/displacement measuring system in accordance with claim 1, wherein the at least one sensor head comprises a housing and at least one of (i) the first sensor unit is arranged at or in proximity of a front end of the housing and (ii) the second sensor unit is arranged at or in proximity of a rear end of the housing.

8. Position/displacement measuring system in accordance with claim 1, wherein the at least one encoded scale body comprises at least one reference marker and the at least one sensor head comprises at least one reference marker sensor unit via which the at least one reference marker is detectable.

9. Position/displacement measuring system in accordance with claim 1, wherein an interpolator device is provided which follows the first sensor unit and the second sensor unit.

10. Position/displacement measuring system in accordance with claim 1, wherein an output driver device is provided.

11. Position/displacement measuring system in accordance with claim 10, wherein the first sensor unit and the second sensor unit have a common output driver device associated with them.

12. Position/displacement measuring system in accordance with claim 10, wherein the first sensor unit and the second sensor unit have separate output driver devices associated with them.

13. Position/displacement measuring system in accordance with claim 1, wherein the predetermined nonlinearity is two times a maximum nonlinearity from a nonlinearity of the first sensor unit and a nonlinearity of the second sensor unit.

14. Position/displacement measuring system in accordance with claim 1, wherein a switch device is provided by which it is switchable whether the measurement signals of the first sensor unit or of the second sensor unit are used for position/displacement determination.

15. Position/displacement measuring system in accordance with claim 14, wherein the switch device receives the measuring signals of the first sensor unit and the second sensor unit and performs a comparison.

16. Position/displacement measuring system in accordance with claim 1, wherein the at least one encoding track has a first end and a second end, said ends abutting one another or being spaced apart from one another.

17. Position/displacement measuring system in accordance with claim 1, wherein the at least one encoding track is configured as an incremental track.

18. Position/displacement measuring system in accordance with claim 1, wherein the at least one sensor head is at least one of (i) positioned and (ii) guided in a non-contacting manner over the at least one encoding track.

19. Position/displacement measuring system, comprising:
    at least one encoded scale body having at least one encoding track extending in a measuring direction;
    a sensor device having at least one sensor head sensitive to the encoding;
    the at least one sensor head comprising at least a first sensor unit and a second sensor unit which provide respective measurement signals and are spaced apart from one another in the measuring direction;
    the first sensor unit and the second sensor unit each comprising a first sensor and a second sensor which are arranged in an offset relationship with respect to one another in the measuring direction; and
    wherein a phase difference between signals of the first sensor and the second sensor is n×90°, where n is an odd natural number.

20. Position/displacement measuring system in accordance with claim 19, wherein an evaluation device is provided by which a check is made or capable of being made as to whether a difference between the measurement signal of the first sensor unit and the measurement signal of the second sensor unit is smaller than a predetermined nonlinearity of the sensor unit or sensor units.

21. Position/displacement measuring system in accordance with claim 19, wherein an evaluation device is provided by which a comparison of the measurement signals of the first sensor unit and the second sensor unit is carried out or capable of being carried out.

* * * * *